(12) United States Patent
Kim et al.

(10) Patent No.: US 11,246,100 B1
(45) Date of Patent: Feb. 8, 2022

(54) APPARATUS AND METHOD FOR SELECTING PATH THROUGH BEAM SEARCH

(71) Applicant: ELECTRONICS AND TELECOMMUNICATIONS RESEARCH INSTITUTE, Daejeon (KR)

(72) Inventors: Chung Sup Kim, Daejeon (KR); Sung Woong Choi, Daejeon (KR); Jong Soo Lim, Daejeon (KR); Ju Yeon Hong, Daejeon (KR); Young Jun Chong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/110,594

(22) Filed: Dec. 3, 2020

(30) Foreign Application Priority Data

Nov. 25, 2020 (KR) .......................... 10-2020-0160006

(51) Int. Cl.
*H04W 52/06* (2009.01)
*H04W 52/38* (2009.01)
*H04W 48/16* (2009.01)
*H04W 56/00* (2009.01)

(52) U.S. Cl.
CPC ........... *H04W 52/06* (2013.01); *H04W 48/16* (2013.01); *H04W 52/38* (2013.01); *H04W 56/001* (2013.01)

(58) Field of Classification Search
CPC ..... H04W 52/06; H04W 48/16; H04W 52/38; H04W 56/001
See application file for complete search history.

(56) References Cited

U.S. PATENT DOCUMENTS

| 7,577,436 B2* | 8/2009 | Ebata ..................... H04W 24/00 455/423 |
| 10,458,931 B1* | 10/2019 | Richardson ........... G01T 1/2014 |
| 10,970,914 B1* | 4/2021 | Clark ....................... G06T 15/06 |
| 2009/0156148 A1 | 6/2009 | Lee et al. |
| 2009/0219285 A1* | 9/2009 | Reshetov ................ G06T 15/06 345/420 |

(Continued)

FOREIGN PATENT DOCUMENTS

| KR | 10-2007-0031506 A | 3/2007 |
| KR | 10-2008-0000936 A | 1/2008 |

(Continued)

*Primary Examiner* — Dominic E Rego
(74) *Attorney, Agent, or Firm* — LRK Patent Law Firm (57) ABSTRACT

A method of selecting a path for transmitting a maximum power from a base station to a terminal includes simplifying a plurality of structures in an area by using OBBs, the area being an area in which beam search is to be performed; forming the plurality of simplified structures into a tree structure for ray tracing; performing the ray tracing by applying a ray tracing relation tree reduction (RRTR) algorithm for reducing an amount of computation of a GPU to the tree structure; and applying a linear regression (LR) algorithm for calculating the maximum power to be transmitted from the base station to the terminal based on a result of the ray tracing.

16 Claims, 12 Drawing Sheets

(56) References Cited

U.S. PATENT DOCUMENTS

| | | | |
|---|---|---|---|
| 2010/0053162 A1* | 3/2010 | Dammertz | G06T 15/06 345/426 |
| 2011/0149773 A1 | 6/2011 | Lee et al. | |
| 2012/0169728 A1* | 7/2012 | Mora | G06T 15/06 345/419 |
| 2013/0331994 A1* | 12/2013 | Ng | G05B 15/02 700/275 |
| 2014/0078143 A1* | 3/2014 | Lee | G06T 15/06 345/426 |
| 2014/0347371 A1* | 11/2014 | Stenson | G06T 1/20 345/501 |
| 2017/0164878 A1* | 6/2017 | Connor | A61B 5/053 |
| 2017/0236325 A1* | 8/2017 | Lecocq | G06T 15/55 345/426 |
| 2017/0352180 A1* | 12/2017 | Qiu | G06T 15/08 |
| 2018/0040155 A1* | 2/2018 | Lecgcg | G06T 7/277 |
| 2019/0197761 A1* | 6/2019 | Saleh | G06T 15/04 |
| 2021/0266826 A1* | 8/2021 | Jung | H04W 24/10 |

FOREIGN PATENT DOCUMENTS

| | | |
|---|---|---|
| KR | 10-2017-0090104 A | 8/2017 |
| KR | 10-2018-0016301 A | 2/2018 |

\* cited by examiner

Area of Ellipse

FIG. 6B

Computation of building area

FIG. 6C

Rx arranged at a predetermined spacing

APPARATUS AND METHOD FOR SELECTING PATH THROUGH BEAM SEARCH

CROSS-REFERENCE TO RELATED APPLICATION

This application claims priority to Korean Patent Application No. 10-2020-0160006 filed on Nov. 25, 2020 with the Korean Intellectual Property Office (KIPO), the entire content of which is hereby incorporated by reference.

BACKGROUND

1. Technical Field

The present disclosure relates to a method and an apparatus for configuring a path for transmitting a power, and more specifically, to a method and an apparatus for selecting a path for transmitting a maximum power to a terminal through beam search.

2. Description of Related Art

Figure 1:
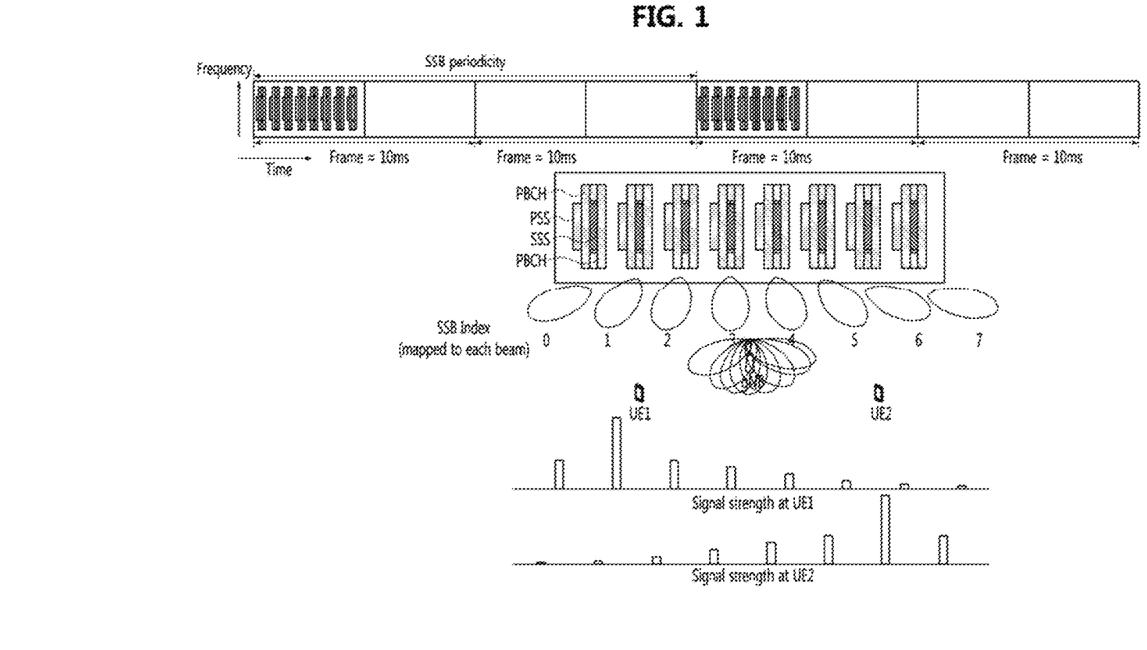
FIG. 1 is a conceptual diagram illustrating a conventional method for selecting a path for transmitting a power.

Currently, the 5G system uses various beam search schemes to select a path for transmitting a maximum power from a base station to a terminal. For example, referring to FIG. 1, the 5G system transmits synchronization signal blocks (SSBs) in various directions according to beam indices determined at a 20 millisecond (ms) cycle in consideration of NR-5G network energy efficiency, and performs beam search within 5 ms. In this case, when a beam direction for transmitting the maximum power from the base station to the terminal is determined using SSBs according to the current 5G system, wideband data communication may be performed.

However, since the current 5G system has an SSB periodicity of 20 ms, there may be a problem of efficiency degradation in NR-5G communication services that require high-speed data communication. Meanwhile, since the current 5G system periodically transmits beams in predetermined directions according to beam indices in order to increase coverage, there may be a problem in that the amount of computation for the beam search increases. Further, the current 5G system has a problem in that when the terminal moves while performing wideband data communication, the data communication should be stopped and the SSBs should be transmitted again.

The conventional radar system estimates a position of a target object by transmitting a specific signal to detect the target object and receiving a signal reflected by the target object. However, the conventional radar system has a problem in that it is difficult to accurately estimate the position of the target object when there are many reflectors around the target object or when the target object moves to a non-line of sight (NLOS) region.

Accordingly, in order to perform wideband communication in the 5G system or improve accuracy of the radar system, it is necessary to estimate the position of the terminal (or, target object) regardless of whether the terminal (or, target object) is located in a line of sight (LOS) or NLOS region, and to estimate powers to be transmitted to all possible positions of the terminal (or, target object).

SUMMARY

In order to solve the above-identified problems, exemplary embodiments of the present disclosure are directed to providing a method for performing wideband data communication at a high speed in a 5G system.

In order to solve the above-identified problems, exemplary embodiments of the present disclosure are directed to providing a method for configuring a path for transmitting a power by applying an algorithm independent from SSB transmissions in a 5G system.

According to an exemplary embodiment of the present disclosure for achieving the above-described objective, a method of selecting a path for transmitting a maximum power from a base station to a terminal may comprise simplifying a plurality of structures in an area by using oriented bounding boxes (OBBs), the area being an area in which beam search is to be performed; forming the plurality of simplified structures into a tree structure for ray tracing; performing the ray tracing by applying a ray tracing relation tree reduction (RRTR) algorithm for reducing an amount of computation of a graphic processing unit (GPU) to the tree structure; and applying a linear regression (LR) algorithm for calculating the maximum power to be transmitted from the base station to the terminal based on a result of the ray tracing.

The forming of the plurality of simplified structures into the tree structure may comprise reducing a plurality of surfaces constituting the simplified structures.

The reducing of the plurality of surfaces may comprise reducing the plurality of surfaces by utilizing normal vectors and vertices for triangles constituting the plurality surfaces.

The reducing of the plurality of surfaces by utilizing normal vectors and vertices may comprise: determining triangles having equal normal vectors among the triangles constituting the plurality of surfaces; determining whether one or more vertices are shared between the triangles having the equal normal vectors; and when one or more vertices are shared between the triangles having the equal normal vectors, determining the triangles having the equal normal vectors as one surface.

The RRTR algorithm may perform ray tracing on a surface of a structure facing a reference structure initially configured by a user in a front direction, and perform the ray tracing again by reconfiguring the reference structure according to a result of performing the ray tracing.

The LR algorithm may be based on a density occupied by the plurality of structures in the area in which the beam search is to be performed.

The LR algorithm may divide the area in which the beam search is to be performed into a plurality of grids, calculate a weight for transmitting a maximum power based on a power value according to a result of performing ray tracing in each of the plurality of grids, and calculate the maximum power to be transmitted from the base station to the terminal by applying the weight.

The RRTR algorithm and the LR algorithm may be applied independently from determination of a direction of a maximum power to be transmitted from the base station to the terminal based on SSBs of a 5G system.

According to another exemplary embodiment of the present disclosure for achieving the above-described objective, an apparatus of selecting a path for transmitting a maximum power from a base station to a terminal may comprise a processor; and a memory storing at least one instruction executable by the processor, wherein when executed by the processor, the at least one instruction may cause the apparatus to: simplify a plurality of structures in an area by using oriented bounding boxes (OBBs), the area being an area in which beam search is to be performed; form the plurality of simplified structures into a tree structure for ray tracing;

perform the ray tracing by applying a ray tracing relation tree reduction (RRTR) algorithm for reducing an amount of computation of a graphic processing unit (GPU) to the tree structure; and apply a linear regression (LR) algorithm for calculating the maximum power to be transmitted from the base station to the terminal based on a result of the ray tracing.

In the forming of the plurality of simplified structures into the tree structure, the at least one instruction may further cause the apparatus to reduce a plurality of surfaces constituting the simplified structures.

In the reducing of the plurality of surfaces, the at least one instruction may further cause the apparatus to reduce the plurality of surfaces by utilizing normal vectors and vertices for triangles constituting the plurality surfaces.

In the reducing of the plurality of surfaces by utilizing normal vectors and vertices, the at least one instruction may further cause the apparatus to: determine triangles having equal normal vectors among the triangles constituting the plurality of surfaces; determine whether one or more vertices are shared between the triangles having the equal normal vectors; and when one or more vertices are shared between the triangles having the equal normal vectors, determine the triangles having the equal normal vectors as one surface.

The RRTR algorithm may perform ray tracing on a surface of a structure facing a reference structure initially configured by a user in a front direction, and perform the ray tracing again by reconfiguring the reference structure according to a result of performing the ray tracing.

The LR algorithm may be based on a density occupied by the plurality of structures in the area in which the beam search is to be performed.

The LR algorithm may divide the area in which the beam search is to be performed into a plurality of grids, calculate a weight for transmitting a maximum power based on a power value according to a result of performing ray tracing in each of the plurality of grids, and calculate the maximum power to be transmitted from the base station to the terminal by applying the weight.

The RRTR algorithm and the LR algorithm may be applied independently from determination of a direction of a maximum power to be transmitted from the base station to the terminal based on SSBs of a 5G system.

According to the exemplary embodiments of the present disclosure, there is an advantage of increasing the amount of wideband data communication by performing beam search through application of an algorithm independent from transmission of SSBs in the 5G system. Further, according to the exemplary embodiments of the present disclosure, wideband data communication may be possible at high speed at the same time. In addition, according to the exemplary embodiments of the present disclosure, regardless of whether the terminal is located in a LOS or NLOS region, powers to be transmitted at all positions may be estimated.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

Figure 2:
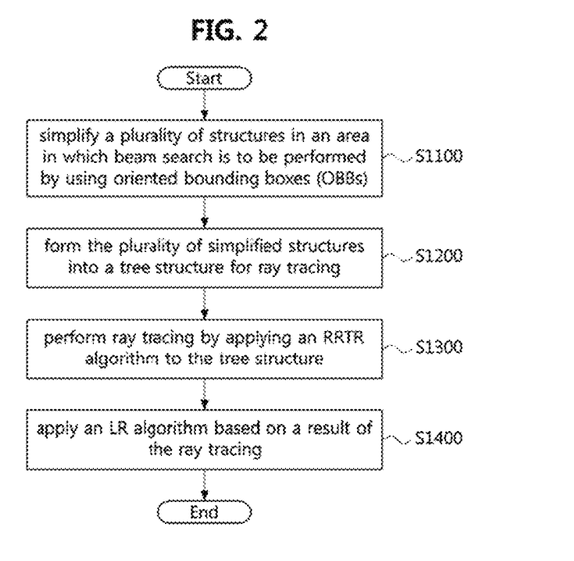
FIG. 2 is a flow chart illustrating a method for selecting a path for transmitting a power according to an exemplary embodiment of the present disclosure.

FIG. 2 is a flow chart illustrating a method of selecting a path for transmitting a power according to an exemplary embodiment of the present disclosure.

Referring to FIG. 2, a method of selecting a path for transmitting a power according to an exemplary embodiment of the present disclosure may comprise a step S1100 of simplifying a plurality of structures in an area in which beam search is to be performed by using oriented bounding boxes (OBBs), as a method for selecting a path for transmitting a maximum power from a base station to a terminal.

In addition, the method according to the present disclosure may include a step S1200 of forming the plurality of simplified structures into a tree structure for ray tracing.

Here, the step S1200 of forming the plurality of simplified structures into the tree structure for ray tracing may include a step of reducing a plurality of surfaces constituting the simplified structures.

In addition, the step of reducing the plurality of surfaces constituting the simplified structures may include a step of reducing the plurality of surfaces by utilizing normal vectors and vertices for the plurality of surfaces composed of triangles.

Here, the step of reducing the plurality of surfaces by utilizing normal vectors and vertices for the plurality of surfaces composed of triangles may include a step of determining triangles having equal normal vectors among the triangles constituting the plurality of surfaces; a step of determining whether one or more vertices are shared between the triangles having the equal normal vectors; and a step of determining the triangles having the equal normal vectors as one surface when one or more vertices are shared between the triangles having the equal normal vectors.

Further, the method according to the present disclosure may further include a step S1300 of perform ray tracing by applying a ray tracing relation tree reduction (RRTR) algorithm that reduces the computational amount of a graphic processing unit (GPU) to the tree structure of the plurality of structures.

Here, the RRTR algorithm may perform ray tracing on a surface of a structure facing a surface of a reference structure initially configured by a user in the front direction, and perform the ray tracing again by reconfiguring the reference structure according to a result of the ray tracing.

In addition, the method according to the present disclosure may include a step S1400 of applying a linear regression (LR) algorithm for calculating a maximum power to be transmitted from the base station to the terminal based on the result of the ray tracing.

Here, the linear regression algorithm may be an algorithm based on a density occupied by the plurality of structures in the area in which the beam search is to be performed.

In addition, the linear regression algorithm may divide the area in which the beam search is to be performed into a plurality of grids, calculate weight(s) for transmitting a maximum power based on a power value according to the result of performing ray tracing in each of the plurality of grids, and calculate the maximum power to be transmitted from the base station to the terminal by applying the weight(s).

Meanwhile, the RRTR algorithm and the linear regression algorithm that calculates the maximum power to be transmitted from the base station to the terminal may be applied independently from operations of determining a direction of a maximum power to be transmitted from the base station to the terminal by using synchronization signal blocks (SSBs) in the 5G system.

Figure 3:
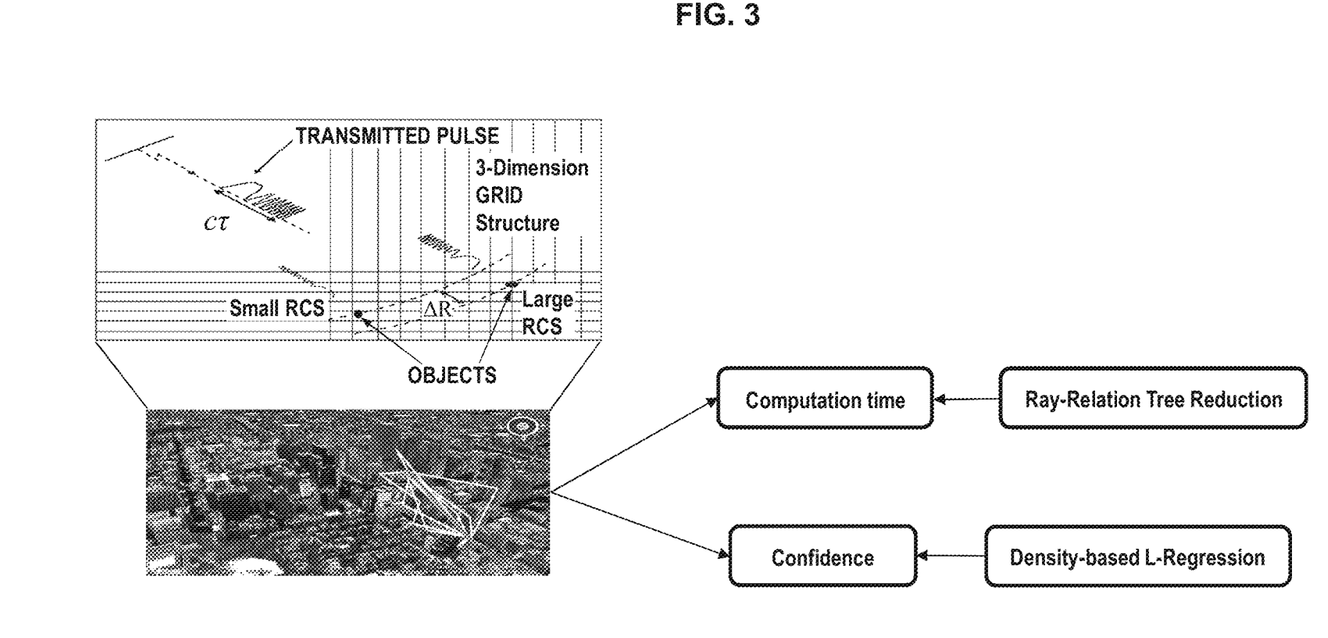
FIG. 3 is an exemplary diagram for describing a method of selecting a path for transmitting a power according to an exemplary embodiment of the present disclosure.

FIG. 3 is an exemplary diagram for describing a method of selecting a path for transmitting a power according to an exemplary embodiment of the present disclosure.

Referring to FIG. 3, the path for transmitting the maximum power from the base station located in an urban area to the terminal according to the beam search method of the present disclosure may be identified. In this case, the RRTR algorithm may be applied to reduce the computational amount of a GPU, and the ray tracing may be performed based thereon. The RRTR algorithm will be described later.

In addition, the method according to the present disclosure may improve inaccuracy of a radar system by applying the LR algorithm based on the result of ray tracing performed by applying the RRTR algorithm, and may calculate the maximum power to be transmitted based thereon.

Meanwhile, since the conventional radar system cannot accurately estimate the location of the target object due to interference of surrounding structures and movement of the target object to a non-light of sight (NLOS) region, the power value cannot be accurately estimated. However, since the LR algorithm according to the present disclosure is based on a density occupied by structures in the area where the beam search is to be performed, it is possible to accurately estimate the power value.

For example, the LR algorithm according to the present disclosure may divide the area to perform the beam search into grids, and calculate weight(s) for transmitting the maximum power based on the power value according to the result of performing ray tracing in each grid. A method of calculating the weight(s) for transmitting the maximum power will be described later.

Figure 4A:
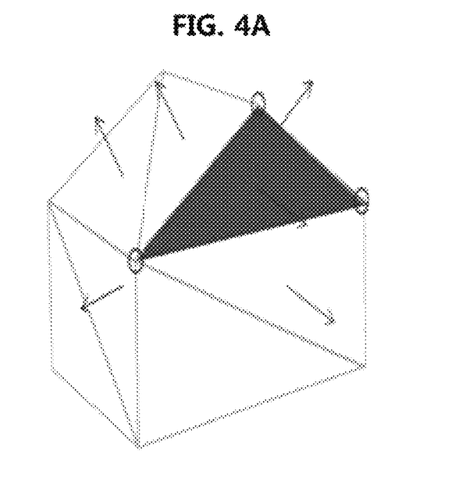
FIGS. 4A to 4C are first to third exemplary diagrams for describing a method of forming a tree structure.
Figure 4B:
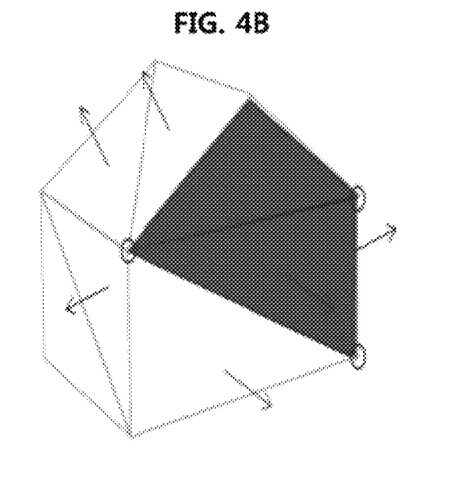
Figures 4C, 5A:
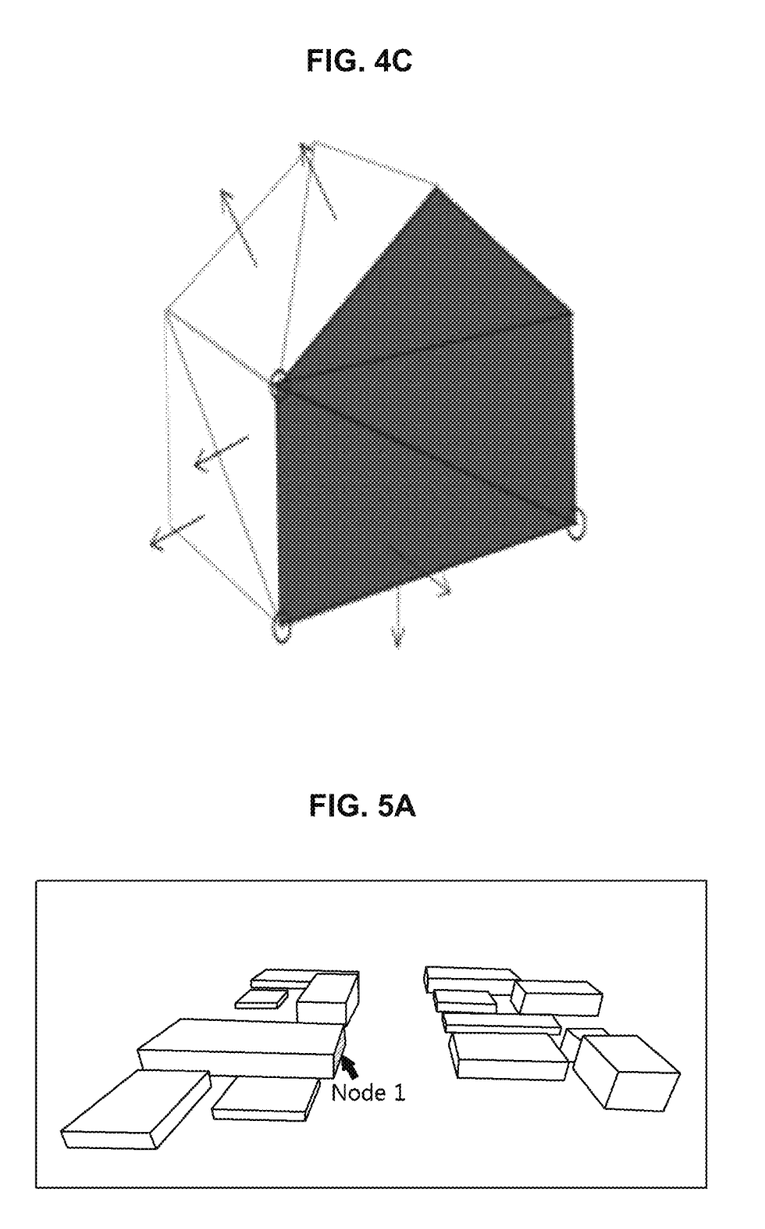
FIGS. 5A to 5G are first to seventh exemplary diagrams for describing a method of performing ray tracing by applying the RRTR algorithm.

FIGS. 4A to 4C are first to third exemplary diagrams for describing a method of forming a tree structure.

According to an exemplary embodiment of the present disclosure, a plurality of structures in an area in which beam search is to be performed may be simplified using oriented bounding boxes (OBBs), and the plurality of simplified structures may be formed in a tree structure for ray tracing.

That is, in an exemplary embodiment of the present disclosure, node numbers may be assigned to the plurality of simplified structures, and since each structure may have a plurality of node numbers, the plurality of structures may be formed in a tree structure based on the node numbers assigned to the structures.

In this case, a node 1 may be designated by the user or may be preconfigured by the user. In addition, the tree structure formed on the basis of the node 1 may include a plurality of nodes for which ray tracing is to be performed.

Meanwhile, according to an exemplary embodiment of the present disclosure, a plurality of surfaces constituting the simplified structures may be reduced to one surface by utilizing normal vectors and vertices. That is, the method according to the present disclosure may determine triangles having equal normal vectors among triangles constituting the plurality of surfaces, and determine whether the triangles having equal normal vectors share one or more vertices. In addition, according to the method of the present disclosure, when one or more vertices are shared between the triangles having equal normal vectors, the corresponding triangles may be determined as one surface.

Referring to FIGS. 4A, 4B, and 4C, it may be seen how to simplify a structure in the area in which beam search is to be performed using OBBs and determine a plurality of surfaces as one surface. For example, surfaces constituting the simplified structure may be composed of triangles, and when adjacent triangles have equal normal vectors and share more than one vertex, the surfaces may be reduced by being determined as one surface. That is, it may be seen that three surfaces that share normal vectors and vertices are reduced to one surface by performing the reduction process shown in from FIGS. 4A to 4C.

Accordingly, in an exemplary embodiment of the present disclosure, a node number may be assigned to one reduced surface of the structure, and each of the plurality of structures may have a plurality of node numbers, so that the plurality of structures may be formed in a tree structure based on the node numbers.

FIGS. 5A to 5G are first to seventh exemplary diagrams for describing a method of performing ray tracing by applying the RRTR algorithm.

According to the method of the present disclosure, ray tracing may be performed by applying the RRTR algorithm for reducing the amount of computation of a GPU to a plurality of structures having a tree structure.

Here, the RRTR algorithm may refer to an algorithm for performing ray tracing on a surface of a structure facing a surface of a reference structure initially configured by the user in the front direction, and performing the ray tracing again by reconfiguring the reference structure according to a result of performing the ray tracing.

That is, the RRTR algorithm may be an algorithm that configures a reference structure for the plurality of structures formed in the tree structure, and removes surfaces of structures from the tree except surfaces of structures facing the surface of the reference structure.

Figure 5B:
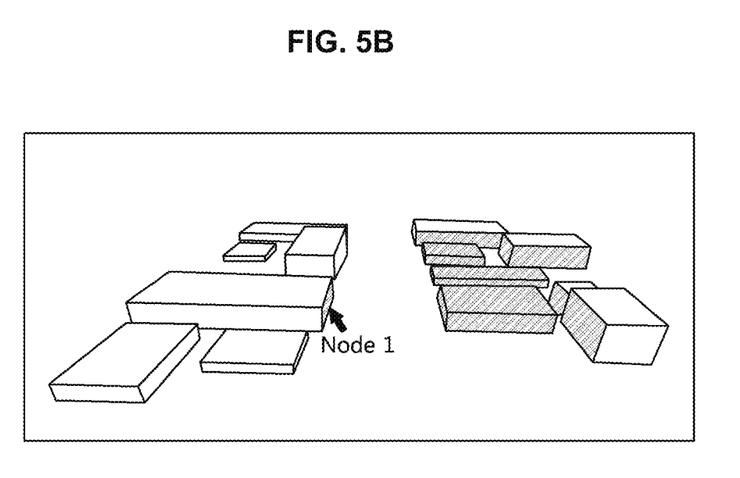
Figure 5C:
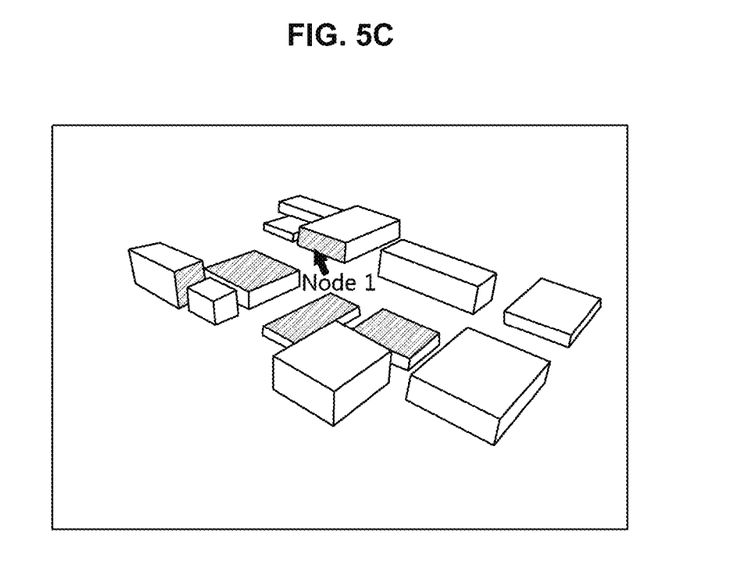

For example, the RRTR algorithm of the present disclosure may remove remaining surfaces excluding shaded surfaces of FIGS. 5B to 5C from the tree structure, with respect to the surface (i.e., node 1) of the reference structure configured or preconfigured by the user in FIG. 5A. In this reason, it is possible to reduce the amount of computation of the GPU that performs the ray tracing.

Figure 5D:
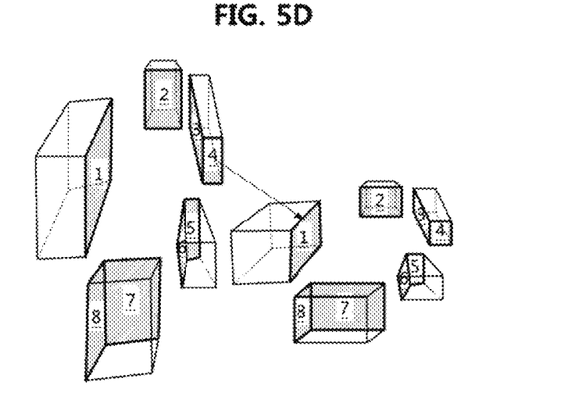
Figure 5E:
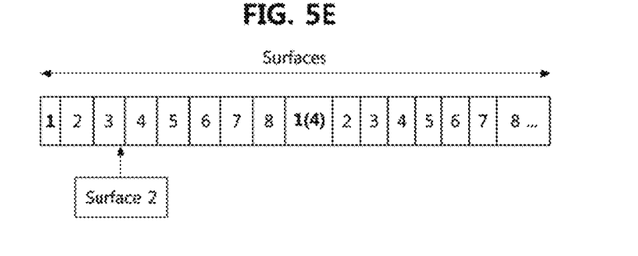

Referring to FIG. 5D, the GPU may reduce the tree structure by applying the RRTR algorithm based on the node 1, and may change the nodes constituting the reduced tree structure to an indexed array structure having a specific form of FIG. 5E. In this case, the indexed array structure may be copied to a graphics card memory (GRAM), and the GPU may perform the ray tracing using the indexed array structure. When the GPU performs the ray tracing, a boolean result indicating TRUE and FALSE may be obtained, and a node (e.g., node 4 in FIG. 5D) whose boolean result is TRUE may be reconfigured as the node 1, and the ray tracing to which the RRTR algorithm is applied may be performed again.

Figure 5F:
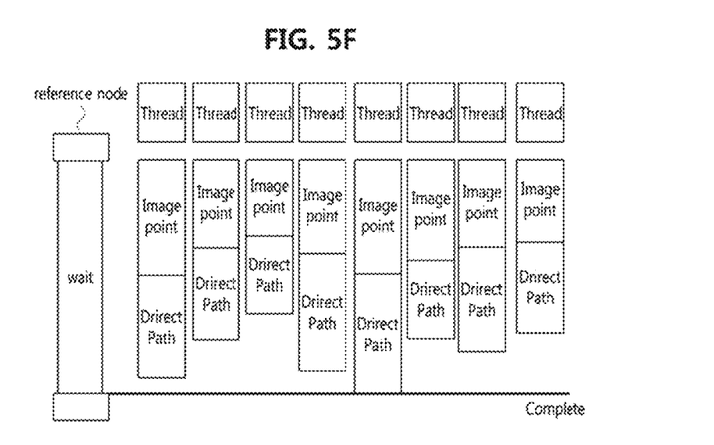

Referring to FIG. 5F, the GPU may perform the ray tracing to which the RRTR algorithm is applied with respect to the node 1 configured or preconfigured by the user, and the ray tracing to which the RRTR algorithm is applied may be performed simultaneously with respect to the node 1 reconfigured according to a boolean result.

Figure 5G:
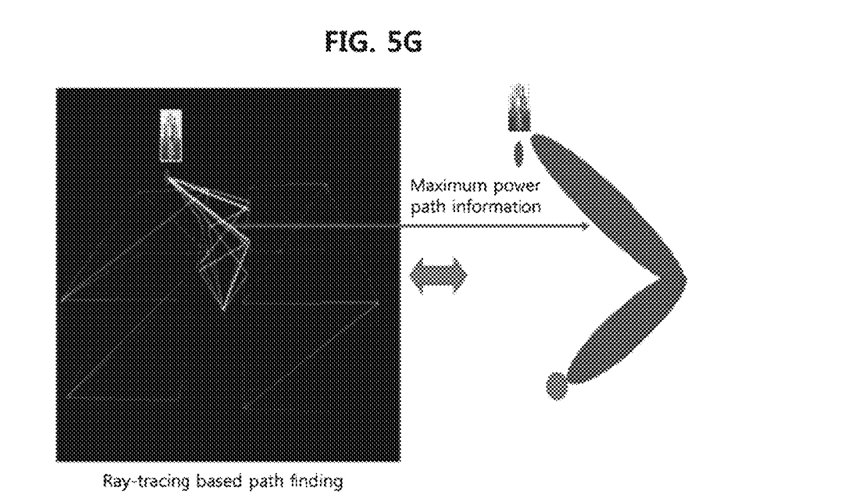

FIG. 5G shows the result of performing ray tracing by applying the RRTR algorithm of the present disclosure. That is, FIG. 5G may show a path through which maximum power is transmitted from the base station to the terminal. Accordingly, according to an exemplary embodiment of the present disclosure, the path for transmitting the maximum power may be derived by performing the beam search, and wideband data communication may be performed through the derived path direction.

Meanwhile, the method according to the present disclosure may be performed in parallel independently from performing wideband communication using the SSBs in the current 5G system, so that the amount of data communication for wideband data communication may increase. In addition, even when the terminal performing wideband data communication moves, the method according to the present disclosure may derive the path for transmitting the maximum power by modifying only a part of the information on the path according to the previous result, thereby reducing the computational amount of the GPU.

FIGS. 6A to 6D are first to fourth exemplary diagrams for describing the LR algorithm for calculating the maximum power to be transmitted from the base station to the terminal.

According to the exemplary embodiment of the present disclosure, the beam search may be performed by applying the LR algorithm that calculates the maximum power to be transmitted from the base station to the terminal based on the result of performing ray tracing. For example, referring to FIG. 6A, the LR algorithm of the present disclosure may be an algorithm based on a density occupied by a plurality of structures in an area in which the beam search is to be performed.

Figure 6A:
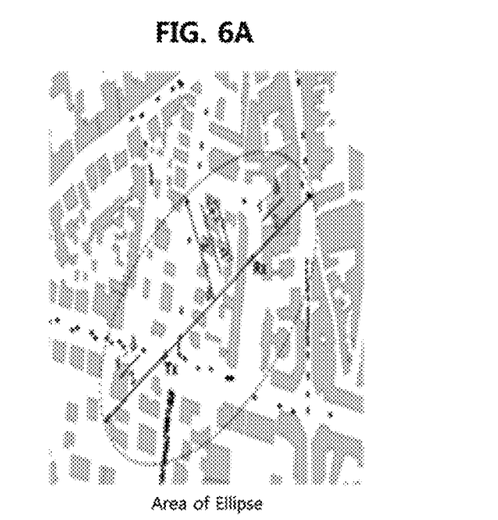
FIGS. 6A to 6D are first to fourth exemplary diagrams for describing the LR algorithm for calculating the maximum power to be transmitted from the base station to the terminal.
Figure 6B:
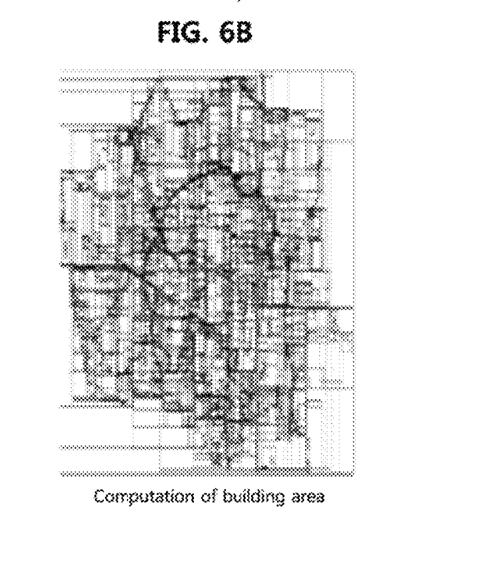

Meanwhile, referring to FIG. 6B, the LR algorithm divides the area in which the beam search is to be performed into a plurality of grids, and weights for transmitting the maximum power may be calculated based on the power value according to the result of performing ray tracing for each of the plurality of grids, as shown in Equation 1 below.

$$\alpha = \sigma_{min} + \frac{\sigma_{mean}}{2}\left(\sqrt{\frac{DS}{AS_{max}}}\right) \qquad \text{[Equation 1]}$$

Here, $AS_{max}$ may mean the size of the entire area subjected to the beam search, and DS may mean an area occupied by a plurality of structures in the entire area in which the beam search is to be performed. Meanwhile, $\sigma_{mean}$ may mean an average of variances of power values according to the results of performing ray tracing for the respective grids obtained by dividing the entire area into the plurality of grids, and $\varnothing_{min}$ may mean a variance value corresponding to the lower 10% of the power values according to the results of performing the ray tracing.

In addition, according to the methods according to the present disclosure, the weight a derived by Equation 1 may be applied to Equation 2, thereby calculating the power value in each of the grids obtained by dividing the entire area in which the beam search is to be performed, and thus the maximum power $P_{result}$ to be transmitted from the base station to the terminal may be calculated.

$$P_{result} = (1-\alpha)*R_{ay} + \alpha*S_{toc}$$

Here, $R_{ay}$ may refer to the power value according to the result of performing general ray tracing in each of the grids, and $S_{toc}$ may refer to the power value in each of the grids, estimated based on the previously measured power statistics.

Figure 6C:
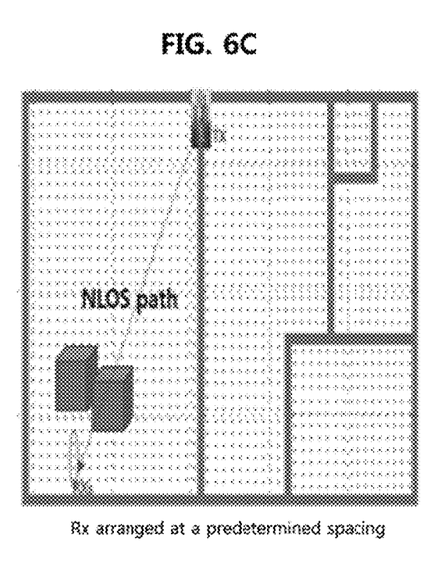
Figure 6D:
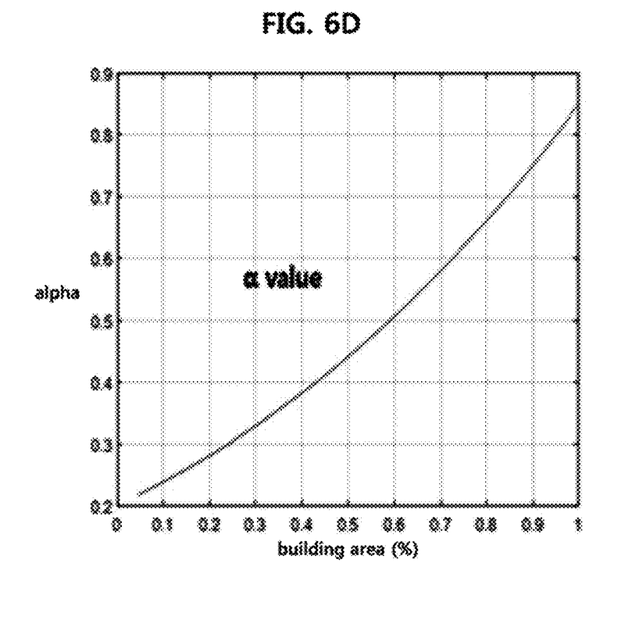

Meanwhile, referring to FIG. 6C, when the terminal receiving a power from the base station is adjacent to another structure or the terminal is located in a NLOS region, in order to apply the LR algorithm for calculating the maximum power that the terminal is to receive, the method according to the present disclosure may divide the entire area in which the beam search is to be applied into grids as estimated movement points of the terminal.

Figure 7:
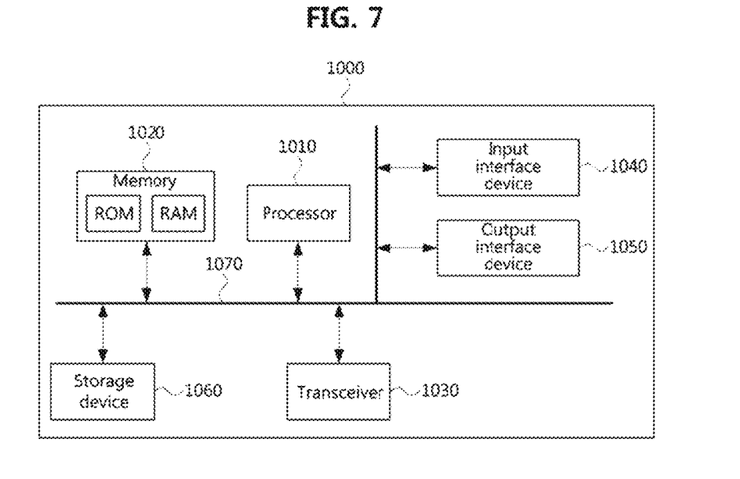
FIG. 7 is a block diagram illustrating an apparatus for selecting a path for transmitting a power according to an exemplary embodiment of the present disclosure.

FIG. 7 is a block diagram illustrating an apparatus for selecting a path for transmitting a power according to an exemplary embodiment of the present disclosure.

Referring to FIG. 7, an apparatus 1000 according to an exemplary embodiment of the present disclosure may comprise a processor 1010, a memory 1020 storing at least one instruction executable by the processor 1010 and execution results of the at least one instruction, and a transceiver 1030 connected to a network for performing communications. In addition, the apparatus 1000 may further comprise an input interface device 1040, an output interface device 1050, a storage device 1060, and the like. Each component included in the apparatus 1000 may communicate with each other as connected through a bus 1070.

The processor 1010 may execute a program stored in at least one of the memory 1020 and the storage device 1060. The processor 1010 may refer to a central processing unit (CPU), a graphics processing unit (GPU), or a dedicated processor on which methods in accordance with embodiments of the present disclosure are performed. Each of the memory 1020 and the storage device 1060 may be constituted by at least one of a volatile storage medium and a non-volatile storage medium. For example, the memory 1020 may comprise at least one of read-only memory (ROM) and random access memory (RAM).

The storage device 1060 may also store information on a form obtained by simplifying a plurality of structures using OBBs, information on a tree structure formed of the plurality of simplified structures, information on a result of applying the RRTR algorithm to the tree formed by the plurality of structures, and information on the maximum power to be transmitted from the base station to the terminal, which is calculated by applying the LR algorithm.

Here, the at least one instruction may cause, when executed by the processor, the apparatus 1000 to: simplify a plurality of structures in an area by using oriented bounding boxes (OBBs), the area being an area in which beam search is to be performed; form the plurality of simplified structures into a tree structure for ray tracing; perform the ray tracing by applying the RRTR algorithm for reducing an amount of computation of a GPU to the tree structure; and apply the LR algorithm for calculating the maximum power to be transmitted from the base station to the terminal based on a result of the ray tracing.

Here, in the forming of the plurality of simplified structures into the tree structure, the at least one instruction may further cause the apparatus 1000 to reduce a plurality of surfaces constituting the simplified structures. Further, in the reducing of the plurality of surfaces, the at least one instruction may further cause the apparatus 1000 to reduce the plurality of surfaces by utilizing normal vectors and vertices for the plurality surfaces composed of triangles.

Here, in the reducing of the plurality of surfaces by utilizing normal vectors and vertices for the plurality surfaces composed of triangles, the at least one instruction may further cause the apparatus 1000 to: determine triangles having equal normal vectors among the triangles constituting the plurality of surfaces; determine whether one or more vertices are shared between the triangles having the equal normal vectors; and when one or more vertices are shared between the triangles having the equal normal vectors, determine the triangles having the equal normal vectors as one surface.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

Although the present disclosure has been described with reference to preferred embodiments, it will be apparent to those skilled in the art that the present disclosure may be variously changed and modified without departing from the spirit and scope of the invention defined in the following claims.

What is claimed is:

1. A method of selecting a path for transmitting a maximum power from a base station to a terminal, the method comprising:
   simplifying a plurality of structures in an area by using oriented bounding boxes (OBBs), the area being an area in which beam search is to be performed;
   forming the plurality of simplified structures into a tree structure for ray tracing;
   performing the ray tracing by applying a ray tracing relation tree reduction (RRTR) algorithm for reducing an amount of computation of a graphic processing unit (GPU) to the tree structure; and
   applying a linear regression (LR) algorithm for calculating the maximum power to be transmitted from the base station to the terminal based on a result of the ray tracing.

2. The method according to claim 1, wherein the forming of the plurality of simplified structures into the tree structure comprises reducing a plurality of surfaces constituting the simplified structures.

3. The method according to claim 2, wherein the reducing of the plurality of surfaces comprises reducing the plurality of surfaces by utilizing normal vectors and vertices for triangles constituting the plurality surfaces.

4. The method according to claim 3, wherein the reducing of the plurality of surfaces by utilizing normal vectors and vertices comprises:

determining triangles having equal normal vectors among the triangles constituting the plurality of surfaces;

determining whether one or more vertices are shared between the triangles having the equal normal vectors; and when one or more vertices are shared between the triangles having the equal normal vectors, determining the triangles having the equal normal vectors as one surface.

5. The method according to claim 2, wherein the RRTR algorithm performs ray tracing on a surface of a structure facing a reference structure initially configured by a user in a front direction, and performs the ray tracing again by reconfiguring the reference structure according to a result of performing the ray tracing.

6. The method according to claim 1, wherein the LR algorithm is based on a density occupied by the plurality of structures in the area in which the beam search is to be performed.

7. The method according to claim 1, wherein the LR algorithm divides the area in which the beam search is to be performed into a plurality of grids, calculates a weight for transmitting a maximum power based on a power value according to a result of performing ray tracing in each of the plurality of grids, and calculates the maximum power to be transmitted from the base station to the terminal by applying the weight.

8. The method according to claim 1, wherein the RRTR algorithm and the LR algorithm are applied independently from determination of a direction of a maximum power to be transmitted from the base station to the terminal based on synchronization signal blocks (SSBs) of a 5G system.

9. An apparatus of selecting a path for transmitting a maximum power from a base station to a terminal, the apparatus comprising:

a processor; and a memory storing at least one instruction executable by the processor, wherein when executed by the processor, the at least one instruction causes the apparatus to:

simplify a plurality of structures in an area by using oriented bounding boxes (OBBs), the area being an area in which beam search is to be performed;

form the plurality of simplified structures into a tree structure for ray tracing;

perform the ray tracing by applying a ray tracing relation tree reduction (RRTR) algorithm for reducing an amount of computation of a graphic processing unit (GPU) to the tree structure; and apply a linear regression (LR) algorithm for calculating the maximum power to be transmitted from the base station to the terminal based on a result of the ray tracing.

10. The apparatus according to claim 9, wherein in the forming of the plurality of simplified structures into the tree structure, the at least one instruction further causes the apparatus to reduce a plurality of surfaces constituting the simplified structures.

11. The apparatus according to claim 10, wherein in the reducing of the plurality of surfaces, the at least one instruction further causes the apparatus to reduce the plurality of surfaces by utilizing normal vectors and vertices for triangles constituting the plurality surfaces.

12. The apparatus according to claim 11, wherein in the reducing of the plurality of surfaces by utilizing normal vectors and vertices, the at least one instruction further causes the apparatus to:

determine triangles having equal normal vectors among the triangles constituting the plurality of surfaces;

determine whether one or more vertices are shared between the triangles having the equal normal vectors; and when one or more vertices are shared between the triangles having the equal normal vectors, determine the triangles having the equal normal vectors as one surface.

13. The apparatus according to claim 10, wherein the RRTR algorithm performs ray tracing on a surface of a structure facing a reference structure initially configured by a user in a front direction, and performs the ray tracing again by reconfiguring the reference structure according to a result of performing the ray tracing.

14. The apparatus according to claim 9, wherein the LR algorithm is based on a density occupied by the plurality of structures in the area in which the beam search is to be performed.

15. The apparatus according to claim 9, wherein the LR algorithm divides the area in which the beam search is to be performed into a plurality of grids, calculates a weight for transmitting a maximum power based on a power value according to a result of performing ray tracing in each of the plurality of grids, and calculates the maximum power to be transmitted from the base station to the terminal by applying the weight.

16. The apparatus according to claim 9, wherein the RRTR algorithm and the LR algorithm are applied independently from determination of a direction of a maximum power to be transmitted from the base station to the terminal based on synchronization signal blocks (SSBs) of a 5G system.

* * * * *